United States Patent
Dobbs et al.

(10) Patent No.: US 7,959,157 B2
(45) Date of Patent: Jun. 14, 2011

(54) SEAL WITH GUIDE MEMBER

(75) Inventors: David Dobbs, Berkley, MI (US); Mark F. Spreitzer, Howell, MI (US); Dennis Nelson Denton, Weddington, NC (US); Kacy D. Denton, Belmont, NC (US); Kevin R. Suva, Wood Dale, IL (US)

(73) Assignee: SKF USA Inc., Elgin, IL (US)

( * ) Notice: Subject to any disclaimer, the term of this patent is extended or adjusted under 35 U.S.C. 154(b) by 708 days.

(21) Appl. No.: 11/610,252

(22) Filed: Dec. 13, 2006

(65) Prior Publication Data

US 2008/0143055 A1    Jun. 19, 2008

(51) Int. Cl.
*F16J 15/32* (2006.01)

(52) U.S. Cl. .......... 277/551; 277/561; 277/572; 29/235

(58) Field of Classification Search ............... 277/551, 277/572, 561; 29/235
See application file for complete search history.

(56) References Cited

U.S. PATENT DOCUMENTS

| | | | | |
|---|---|---|---|---|
| 2,358,536 A | * | 9/1944 | Reynolds | 277/561 |
| 2,482,029 A | * | 9/1949 | Reynolds | 277/504 |
| 2,631,906 A | * | 3/1953 | Hudson | 277/555 |
| 2,743,950 A | * | 5/1956 | Helfrecht et al. | 277/561 |
| 3,447,848 A | * | 6/1969 | Pitner | 384/484 |
| 3,576,328 A | * | 4/1971 | Vose | 277/558 |
| 3,606,352 A | * | 9/1971 | Lutz | 277/568 |
| 4,274,641 A | * | 6/1981 | Cather, Jr. | 277/309 |
| 4,553,763 A | * | 11/1985 | Ehrmann | 277/561 |
| 4,575,104 A | * | 3/1986 | Nagasawa et al. | 277/551 |
| 4,588,195 A | * | 5/1986 | Antonini et al. | 277/504 |
| 4,669,737 A | | 6/1987 | Diffenderfer | |
| 4,696,479 A | * | 9/1987 | Karcher | 277/353 |
| 4,750,748 A | * | 6/1988 | Visser | 277/561 |
| 4,844,484 A | * | 7/1989 | Antonini et al. | 277/561 |
| 5,052,695 A | * | 10/1991 | Curtis | 29/235 |
| 5,167,419 A | * | 12/1992 | Robertson | 277/552 |
| 5,186,472 A | | 2/1993 | Romero et al. | |
| 5,421,592 A | * | 6/1995 | Petrak | 277/349 |
| 5,503,404 A | | 4/1996 | Newton et al. | |
| 5,522,600 A | * | 6/1996 | Duckwall | 277/402 |
| 5,709,018 A | * | 1/1998 | Dugan | 29/235 |

(Continued)

FOREIGN PATENT DOCUMENTS

DE    2340275    10/1974

(Continued)

OTHER PUBLICATIONS

European Patent Office, Partial European Search Report, Mar. 31, 2008, pp. 1-4, Munich Germany.

(Continued)

*Primary Examiner* — Alison K Pickard
(74) *Attorney, Agent, or Firm* — Vedder Price P.C.

(57) ABSTRACT

An oil seal having the usual lips for retaining oil and a guide member made of a variety of relatively stiff or rigid materials. The guide member is made slightly larger than the smallest diameter of the seal member when the seal rests on the shaft. The seal member can have the guide member on either the air side or the oil side of the seal. The disclosure also relates to a shipping plug, which is inserted into the seal and retains the oil in place during shipping when the seal is installed but a shaft is not installed.

14 Claims, 5 Drawing Sheets

U.S. PATENT DOCUMENTS

| | | | |
|---|---|---|---|
| 5,713,579 A | 2/1998 | Petrak et al. | |
| 5,813,676 A * | 9/1998 | Antonini et al. | 277/551 |
| 6,293,558 B1 * | 9/2001 | Crapart | 277/552 |
| 6,357,757 B1 | 3/2002 | Hibbler et al. | |
| 6,367,810 B1 | 4/2002 | Hatch | |
| 6,406,034 B1 | 6/2002 | Alcantara et al. | |
| 6,550,781 B1 | 4/2003 | Robotham | |
| 6,568,684 B2 | 5/2003 | Bedford et al. | |
| 6,586,684 B2 | 7/2003 | Frutschy et al. | |
| 6,974,136 B2 * | 12/2005 | Vignotto et al. | 277/549 |
| 7,284,759 B2 * | 10/2007 | Heldmann et al. | 277/351 |
| 7,347,424 B2 * | 3/2008 | Madigan | 277/551 |
| 2002/0163137 A1 | 11/2002 | Esumi | |
| 2004/0169338 A1 | 9/2004 | Hintenlang et al. | |
| 2005/0109889 A1 | 5/2005 | Heldmann et al. | |
| 2009/0189357 A1 * | 7/2009 | Madigan | 277/551 |

FOREIGN PATENT DOCUMENTS

| | | |
|---|---|---|
| EP | 1375308 | 1/2004 |

OTHER PUBLICATIONS

European Patent Office, Extended European Search Report, Jul. 18, 2008, pp. 1-13, Munich, Germany.

* cited by examiner

SEAL WITH GUIDE MEMBER

BACKGROUND OF THE INVENTION

The present invention relates generally to oil seals and more particularly, to oil seals having portions which can serve as a guide to shafts being inserted through the seals, especially insertions from the air side of the seal.

Seals made according to the present invention generally have a funnel-shaped guide member, or other means to guide a shaft being inserted therethrough, and in most embodiments have the seal band on the seal with which these seals are concerned which is of a smaller diameter than the innermost diameter of the seal guide member.

These seals are also made in such a way that the insertion to be made comprises a splined shaft or the like from the air side of the seal, while these are a few oil seals which have the splined portion of the shaft received from the oil side of the seal. The present invention relates in most embodiments to seals which are intended to have a generally funnel-shaped member of slightly larger diameter of than the diameter of the seal member. Consequently, for most embodiments there is intended to be no residual contact between the guide member and the shaft, once the shaft member has been inserted within the guide. Moreover, the present invention includes a novel shipping plug or portion which will help to keep lubricant on the seal until it is inserted in the counterbore in which it is intended to be used.

Use of a seal having a funneled shaped guide for the shaft differs from the prior art insofar as the funnel shaped guide is generally on the other or air side of the seal rather than the oil side of the seal. Moreover, in most embodiments, the air side of the funnel shape has an innermost portion which was thought to be insufficient, inasmuch as there could be some damage to the shaft or to the seal while inserting the shaft therethrough. However, it has been discovered that, if the shaft is just slightly smaller than the inside of the funnel, the flexibility of the seal lip is such that the seal will not be adversely affected, while the advantage of having the funnel shaped portion with its innermost extent still free from, and not in contact with, or limited contact with the shaft, once installation has been completed.

It is therefore an object of the present invention to provide, in one embodiment, a generally funnel shaped installation guide for a shaft within an oil seal.

Another object is to provide an oil seal having a captive member attached thereto, with the captive member providing a funnel shaped installation guide made from a non-metallic material such as a plastic or like relatively stiff material.

A further object is to provide an oil seal and installation guide wherein the seal body is carried by or in relation to one member and the installation guide by another, with the two being affixed or associated in use.

A still further object of the invention is to provide an oil seal having a highly flexible portion supporting the seal on the inner portion of the seal body, and a funnel shaped plastic material being separately formed but installed in place within the seal so the components function as a unit.

A still further object is to provide a seal with a first axially extending casing member suitable for reception in a counter bore and a return portion of the casing being also provided radially inside the first casing member, thereby providing a channel or the like for the insertion of the funnel member.

Another object is to provide a composite seal having a funnel-shaped element made from a hard, thermoplastic or like material.

A further object is to provide another embodiment wherein the funnel shaped portion is entirely made from the material from which the seal casing is formed, and which is located inside the channel, is angled first radially inwardly and ultimately axially outwardly from the shaft being sealed.

A still further object of the invention is to provide another embodiment having an enlarged diameter seal casing portion, with such portion serving as the outside diameter of the casing.

Yet another object of the invention is to provide a guide for installation of the shaft which is simple and which is made from the material in which the casing is made.

An additional object is to provide a seal which has an ability to exclude additional contaminants.

Another object of the invention is to provide a guide member with a protective shipping plug designed to protect the integrity of the seal band of the oil seal, and retain lubricant until the installation is complete.

Another object of the invention is to provide an oil seal which can be inserted into a counterbore, with the oil side of the seal being received in the counterbore, and which has a funnel shaped formation intended to guide a splined shaft through the seal, preferably from the air side of the seal.

SUMMARY OF THE INVENTION

The invention achieves these objects and others which are inherent therein by providing an oil seal having a casing with an outside diameter intended to be received within a seal counterbore, a seal body mounting portion on the casing, and an oil seal body including air and oil side surfaces meeting along a seal band of intended contact with an associated shaft, and a guide member which usually has a larger diameter than that of the seal band, with the guide member having a generally funnel-shaped configuration, and the funnel extending from larger to smaller diameter toward the seal band.

The manner which these and other objects of the invention are achieved in practice will become more clearly apparent when reference is made to the accompanying detailed description of the invention set forth by way of example, and shown in the accompanying drawings in which the like reference numbers indicate corresponding parts throughout.

DESCRIPTION OF THE PREFERRED EMBODIMENTS OF THE INVENTION

While the invention may be practiced in a number of different forms, including those shown, a few specific illustrations of the invention and the preferred practice of the invention will now be given.

Figure 1:
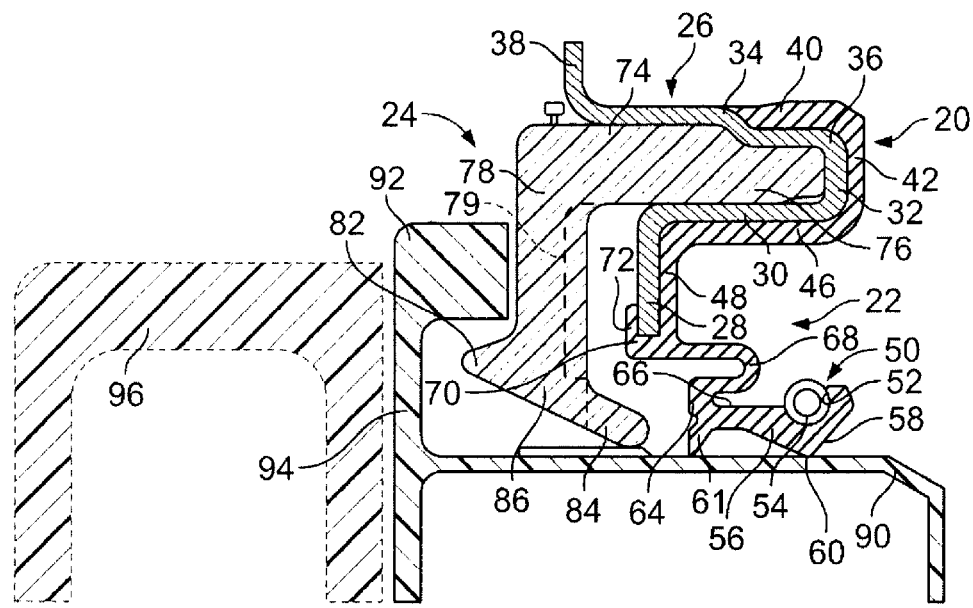
FIG. 1 is a vertical sectional view of a portion of the composite oil seal of the invention, showing the "High-Flex" form of seal, including an installation guide and an oil seal portion, shown with one version of the shipping guide inside the composite seal portion where it is protected during shipping.

Referring now to the drawings in greater detail, and in particular to FIG. 1 there is shown a composite oil seal generally designated 20 having an oil seal portion generally designated 22 and an installation guide generally designated 24. The oil seal 20 includes a casing generally designated 26, including an inner radial flange 28 and inner axial flange 30, an offsetting portion 32, and an outer axial flange 34. These flanges may also be said to define a channel 30, 32, 34 between them.

In the embodiment shown, a minor intermediate portion 36 is provided, constituting a small step in the outer axial flange 34, and there is also shown a depth stop flange 38 which limits the travel of the seal into the counter-bore with which it is associated.

The elastomeric portion includes an outer diameter, slightly stepped portion 40, an end face portion 42, a return portion 46, an inner seal mounting portion 48 having a seal body generally designated 50 attached thereto. The seal body 50 includes a spring groove 52, in which is received a garter spring 54.

Referring now to the seal body 50 in particular, there is shown an air side 56, an oil side 58 of the body 50 and a seal band 60 where the air and oil sides 56, 58 meet. There is an optional dirt lip 61, provided at an end opposite the oil side 58 of the seal body 50.

Referring now to the seal body generally designated 50, in this embodiment, the body 50 is supported by a complex arrangement of curved surfaces, which include a radially innermost portion 64, an inner axial portion 66, a radially extending intermediate portion 68, and an outer axial portion 70. The outer axial portion terminates in a bonding portion 72. These elements comprise a very flexible mounting for the lip, which has, several degrees of radial and axial freedom compared to an ordinary seal not having them. This type of seal is sometimes called a "Hi-Flex" seal.

The other main portion of the inventive seal comprises a monolithic installation guide member 24 which includes a radially outer mounting flange 74, and in this embodiment a narrowed nose section 76. In addition, the installation guide includes a principal radial portion 78, which includes several thin ribs 79 of reduced cross section in respect to the otherwise thicker radial portion 78. The molded installation guide generally designated 24 is also shown to include a heel portion 82 of an enlarged diameter, a toe portion 84 of reduced diameter in respect to the heel portion 82, and an intermediate guide surface comprising a sloping or tapered section 86.

Figure 2:
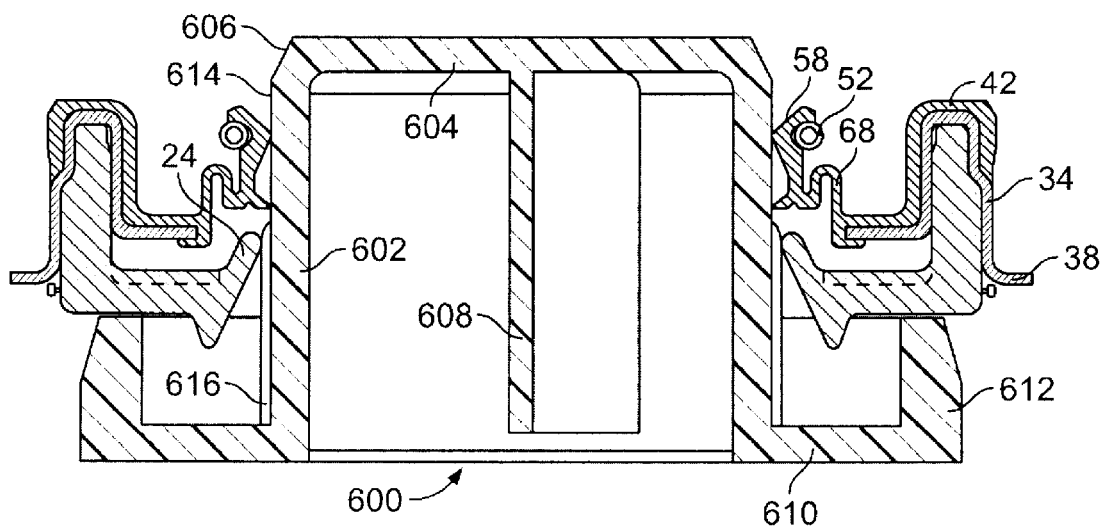
FIG. 2 is a vertical sectional view of the seal of FIG. 1, showing it associated with the shipping plug of the invention.

It is very important to this embodiment of the invention that the toe portion 84 is somewhat larger than the seal band 60, including the diameter of the seal band when the seal band is in place on the shaft 84 (FIG. 2). In the illustration, a shipping and protective portion 88 is shown, which includes a radially inner seal band protective flange 90, a radially outer guide surface 92, a connecting portion 94 and a u-shaped sectional guide 96 which is formed and used with the protective flange 90.

Figure 3:
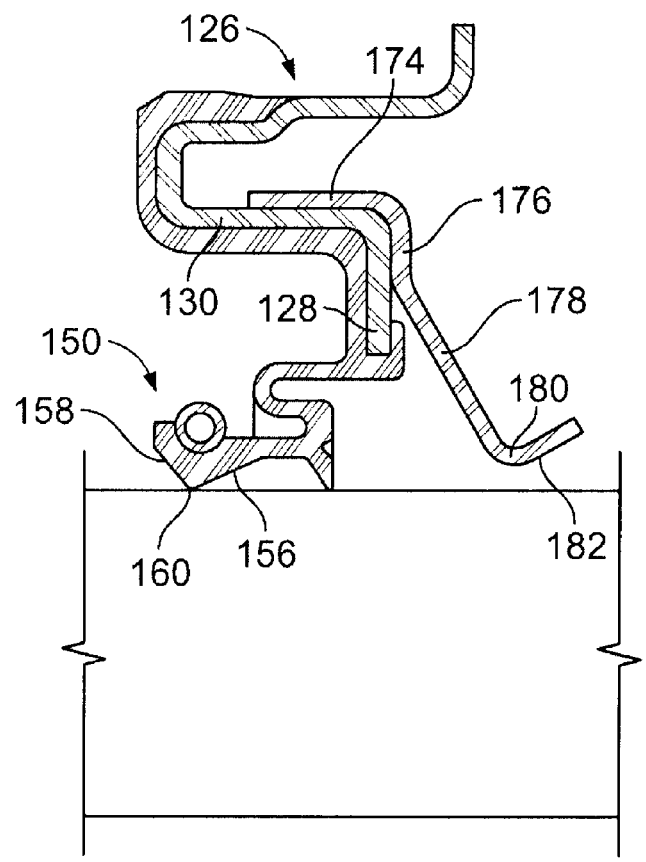
FIG. 3 is a vertical sectional view of another embodiment of the invention, showing the installation guide made from metal and secured to an inner axial flange of the seal casing.

Referring now to FIG. 3 in greater detail, there is shown an arrangement which is very similar to that shown in FIGS. 1 and 2. These include the casing 126, the seal body 150 having air and oil side surfaces 156, 158, meeting along a seal band 160. The convoluted or "Hi-Flex" form of support for this body 150 is the same as are the radial flange 128 and other components associated with the casing member 126. However, the guide member is different. The guide member includes an axial flange or casing 174, a radial portion 176, and outwardly angled portion (angled out towards the air side of the seal 178, a curvilinear minimum diameter 180 and an angled flange 182. Thus, the surface 186 serves as the guide, and is fastened tightly-over the flange 130 of its counterpart.

Figure 4:
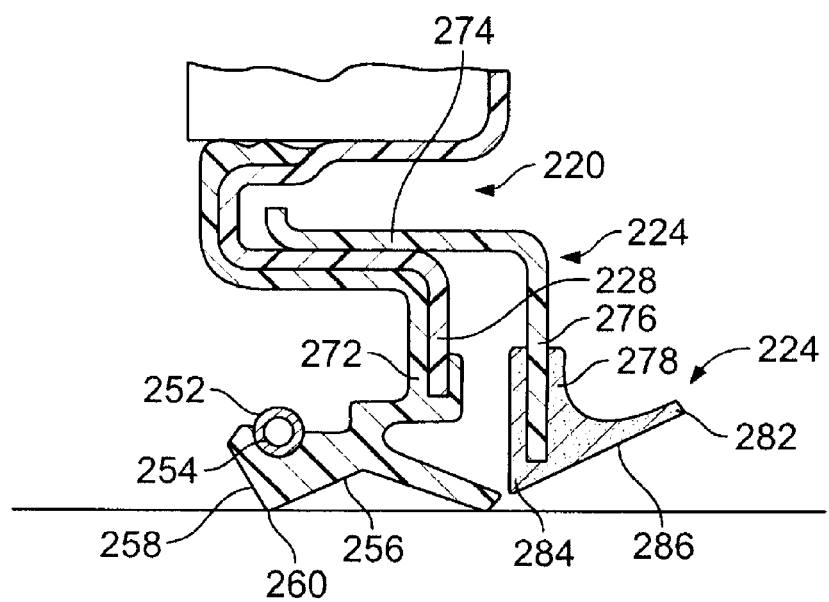
FIG. 4 is a figure similar to FIG. 1 but showing the installation guide being manufactured with a casing and the plastic portion bonded thereto, one being metal and the other being plastic.

Referring now to FIG. 4, there is shown a guide member generally designated 224, which has a simplified mounting system and which uses a bonding portion 272 adhered to the radial flange 228 of the main casing 220. The seal includes a garter spring groove 252, the garter spring 254, and further includes the air side 256 and the oil side 258 as its counterparts in the other illustrations. There is also a seal band 260 which corresponds to its counterpart in the other figures. In this form, there is an axially extending mounting portion 274 and a radially extending portion 276. The funnel-shaped guide generally designated 224 includes a relatively rigid plastic portion 278, having an enlarged diameter heel portion 282, a reduced diameter toe portion 284, and an intermediate angled or sloping surface 286. The toe portion of the guide 224 is nevertheless larger in diameter than the seal band 260, even when the seal band is placed over the shaft or other application. This embodiment is the same as that of FIG. 3, except that it uses a formed part of the guide member made from plastic or other non-metal, which is different from that of FIG. 3.

Figure 5:
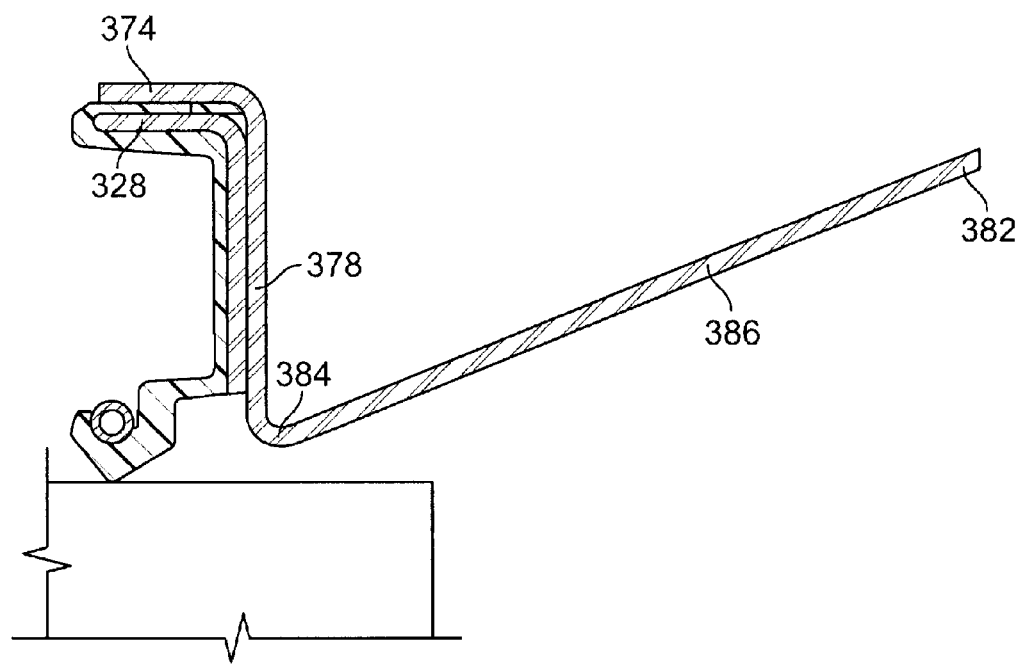
FIG. 5 is a vertical sectional view showing the installation guide and showing a guide made from one piece of metal.

FIG. 5 shows an embodiment which features a greatly enlarged heel portion 382, a very large inclined portion 386 and a toe portion 384. This unit includes a radially extending metal portion 378, and an axially extending flange 374 for mounting purposes. This illustration shows that the mounting flange 374 of the casing lies radially outside the components 328,329, and thus is trapped between the rubber O.D. 329 of the seal and the counterbore (not shown).

Figure 6:
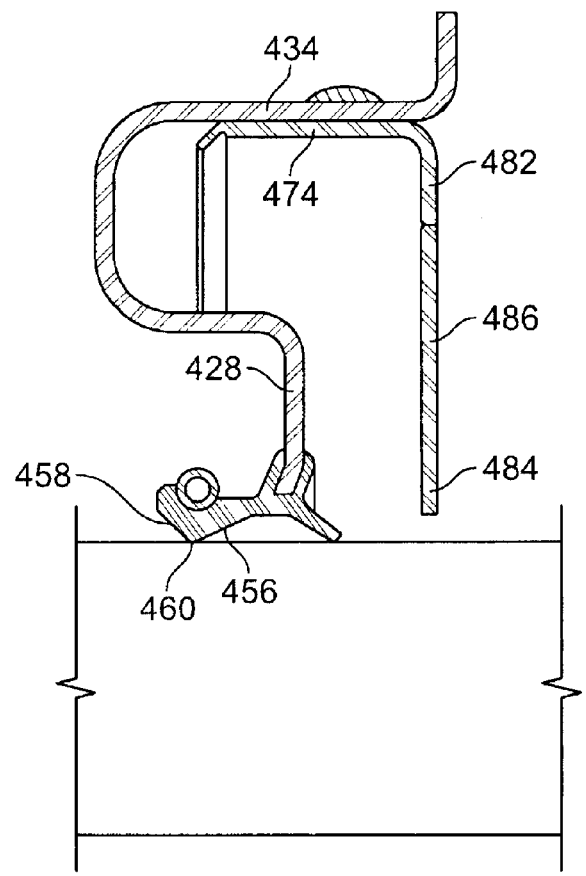
FIG. 6 is a vertical sectional view showing an all metal version of the installation guide, without the taper or cone shape.

FIG. 6 shows an embodiment wherein the seal is mounted on a radially extending flange 428 and includes the air and oil side surfaces 456, 458, and the seal band 460. In this instance, guide member 484 is not tapered but fits snugly inside the outer casing 434 in which the inner casing 474 is received. The heel and toe portions 482, 484 are provided without any taper, and they are located on a radially extending guide surface 486.

The present invention is particularly advantageous where it is desired to protect a non-unitized seal lip from shaft spline damage and lip inversion. The concept is to use a guide or a funnel, which protects the lips during installation of the shaft preferably through the seal on the air side. Where the funnel is sufficiently stiff, it can support the weight of the shaft during the installation process and hence is able to control any damage which might occur. Of course, the lip of the seal being supported in the manner shown means that the lips may be moved about a certain distance, either for axial or radial, without their being permanently displaced.

One presently preferred form includes a non-contacting funnel which can therefore be free of contact when the seal is installed, and the shaft goes entirely through the seal and takes its place in the installation. Thus, there is no extra friction or any contact with the guide in this position.

The presently preferred form of seal is the type shown in FIG. 1, which includes a section supporting the funnel between the heel and the toe. This could include some scalloped or reduced cross-section portions of the member to support the seal to help reduce the cost and total stiffness of the guide.

The seal shown in FIG. 4 is the second most advantageous feature, even though it will be understood that seals of this kind may include, in addition to the metal portion 274, some additional plastic or non-metallic material enabling it to be wedged in the channel between the two axial flanges shown in the drawings as 34 and 30 in FIG. 1.

Both the illustrations of FIG. 1 and FIG. 4 may be modified by a less complex support for the seal 150 or the like. The seal of FIG. 3 includes the complex or Hi-Flex mounting for the seal lip, but is shown with a guide member made from metal. Of course, this could use a double mounting portion, namely having, in addition to the axially extending portion 174, a second mounting section consisting of the flange 174 being doubled back upon itself so as to fit snugly into the return space or channel between the two flanges 130, 126.

The embodiment shown in FIG. 5 could also use a mounting casing which would have two axial flanges spaced a distance apart, and having the mounting portion 374 extending between such members. The least expensive form of seal with a guide unit is shown in FIG. 6, and this does not use a tapered guide of any kind, but instead uses the straight radial portion 484. This seal and the seal of FIG. 5 could be used because of the advantages of lower cost.

Figure 7:
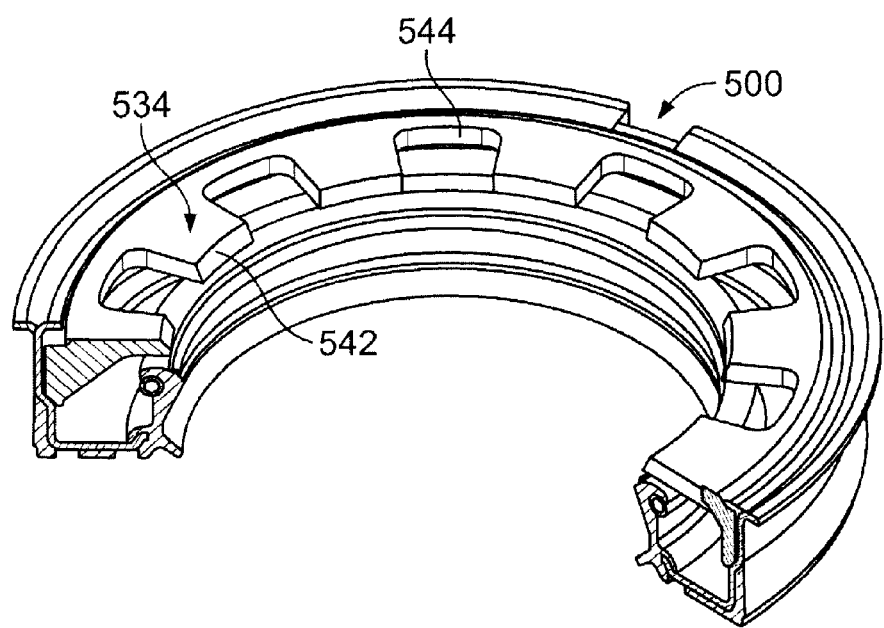
FIG. 7 is a perspective view, with portions broken away, of the seal of the invention, wherein the guide member is located on the oil side of the seal, showing the guide member being scalloped.
Figure 8:
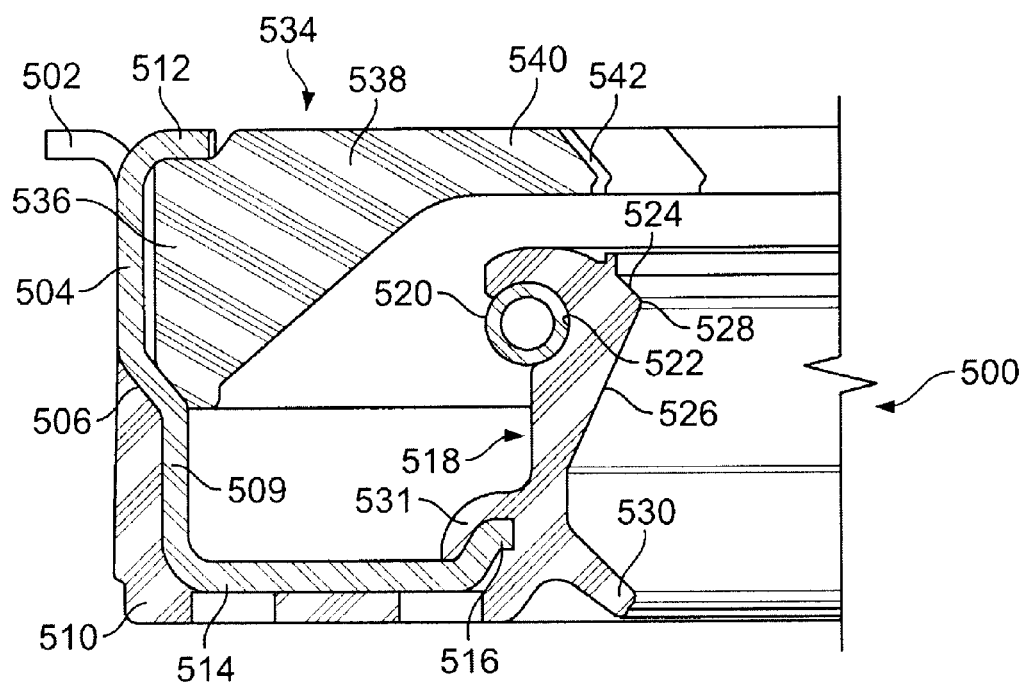
FIG. 8 is an enlarged vertical sectional view of a portion of the seal of FIG. 7, showing the guide member held in place by the retention barb.

Referring now to FIGS. 7 and 8, there is shown a variation of the foregoing described seals. In the part shown in FIG. 7, the seal generally designated 500, includes a depth stop flange 502, an axially extending outer diameter flange 504, a stepped portion 506, and the remainder of the axial flange 509. A rubber or plastic additional O.D. portion 510 surrounds the flange 509 and is adapted to snugly engage the counterbore. The metal portion includes an occasional retention barb 512 for purposes which will be described herein.

The seal includes a radial flange 514 with a slightly offset portion 516 at the bottom thereof. The elastomeric oil seal generally designated 518 includes a garter spring 520, a spring groove 522, an oil side surface 524, an air side surface 526, and a seal band 528 where these two meet. A dirt lip of 530 is provided as well as a bonding portion 531. The sawtoothed protective flange generally designated 534 is shown to include an axial or outer diameter section 536, a generally radial body section 538 and an inner section 540.

The combination of the retention barb 512 and the offset in the flange 506 confine the protective flange 534 in place. This will be noted by reference to FIG. 7. The portion 534 which is of a reduced diameter on its inner portion 540, also includes outer portions 544 of increased diameter. As a result, there is a sawtooth-like profile to the inside of the portion 534.

Although the protective flange or funnel unit is on the oil side of the seal, and the innermost diameter 542 is larger than the innermost diameter of the seal lip 528, the function is still the same and is adapted for inserting the shaft from the oil side of the seal. Provided that the seal lip is not too small a diameter, and the seal lip is flexible enough not to be damaged by the incoming plain shaft, or in some cases even a splined shaft, the seal assembly is satisfactory. A high-flex type of seal may be used in this connection, and is optional.

FIG. 2 shows a shipping plug and oil retainer generally designated 600. The plug 600 comprises a cylindrical sidewall 602, an end face 604 portion and a tapered annular surface 606 joining the two. There is a thin central wall 608 joined to the end face 604 and which extends parallel to the sidewall 602, and which is adapted to be grasped by the fingers of a user for installation and removal. In addition, there is a radially extending annular end wall 610 with an outer stub wall 612 extending back toward the taper 606 or oil seal 50, and terminating closely adjacent or actually touching the radial wall 78 on the installation guide 24.

The shipping plug 600 provides a smooth surface 614 of a slightly greater diameter than the ID or seal band 60 of the seal lip 50. Accordingly, there is oil-tight contact between these parts 614, 60.

Another feature of the shipping plug 600 is the contact between the spaced apart ribs 616 and the inside diameter 84 of the toe or innermost portion of the guide member 24. Preferably there are three or six of the ribs 616, although there could be a different number. Preferably, each rib 616 is from about 0.005 to about 0.025, more or less, inches high.

Because the plastic or like material from which the guide member 24 is constructed is much stiffer than the elastomer from which the sealing lip 50 is made, the interference between the guide 24 and the ribs 616 has a stronger grip on the guide member 24 than that between the inner surface of the seal 60 and the surface 614 of the shipping plug.

Accordingly, when the seal is installed in place as shown in FIG. 1, the axle, or in the case of a pinion seal, the drive shaft, is not installed. However, the auto or truck is shipped with the seal installed in the counter bore, but the remainder of the installation is not complete. Therefore, a plug or the like must be installed so that the oil or grease will be retained in the differential cavity, that is, toward the right in FIG. 1 or toward the top in FIG. 2. The provision of the shipping plug allows the plug to be inserted in a secure manner, yet be able to be easily removed by grasping the central wall 608.

Figure 2A:
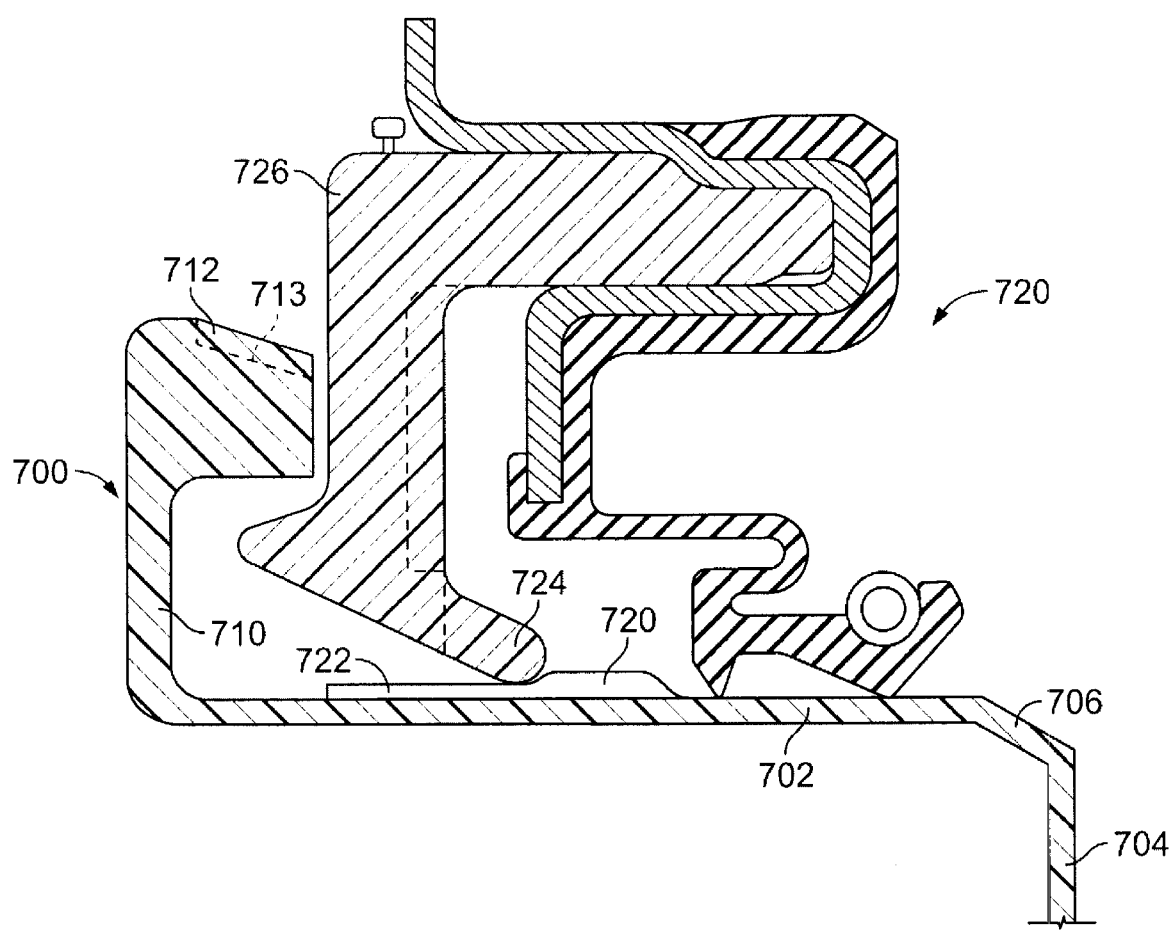
FIG. 2A is a vertical sectional view similar to FIG. 2 and showing the "snap in" feature of the invention.

Referring now to FIG. 2A, an additional feature of the invention is shown. This shows a shipping plug and oil retainer assembly generally designated 700. The plug 700 comprises a cylindrical sidewall portion 702, an end face portion 704 and a tapered surface 706 joining the two. This shipping plug 700 also includes an outer radial wall 710, and an axially extending gripping member 712 serving as its outermost diameter. The gripping member 712 includes plural indentations 713. The seal itself is very similar or identical to the seal 20 shown in FIG. 2. That is, the seal 720 includes all of the features of the seal in FIG. 2.

However, there is an additional feature which enables the shipping plug assembly 700 to have a so-called "snap-in" feeling which is provided by the radially enlarged rib portion 720, formed on the inner end portion of the ribs 722. Accordingly, when the toe portion 724 is pressed into position over the shipping plug 700, the enlarged formation 720 is first on or near resting on the cylindrical surface 702, then the toe portion 724 of the installation guide 726 rides over the enlarged formation 720, and finally comes to rest lying on the rib 722.

This creates a "snap-in" action or feature for the entire seal mechanism 720. This feature of the enlarged portion is preferably placed, for example, on every other rib, when there are six ribs present on the shipping plug. Typically, the height of the ribs 722 above the surface of the cylindrical sidewall 702 is from about 0.005 to about 0.020 inches, with the radially enlarged portion being about 0.003 to about 0.010 inch further.

Preferably, the shipping plugs 600, 700 are made from a relatively rigid thermoplastic material, but other materials could be used.

It will thus be seen that the present invention provides a novel seal with a guide member and also a shipping plug having a number of advantages and characteristics, including those herein pointed out and others which are inherent in the invention. Several examples having been shown, it is anticipated that modifications and changes will occur to those skilled in the art and that such changes may be made without departing from the spirit of the invention or the scope of the appended claims.

What is claimed is:

1. An oil seal comprising:
a seal casing including:
a first portion adapted to be received in a machine counterbore;
a return portion being spaced radially inwardly from said first portion adapted to be received in said machine counterbore, to define a channel between said first portion and said return portion; and
a radially inwardly directed flange;
an elastomeric seal supported by said radially inwardly directed flange, said elastomeric seal including a seal body being supported by and extending from said flange, said seal body having air and oil side surfaces meeting along a seal band of intended contact with a rotary member, said seal body further having a plurality of curved surfaces thereby providing radial and axial flexibility of said seal body, and
a funnel shaped guide member operative to guide an end portion of the rotary member into said oil seal as said rotary member is inserted into said oil seal, said funnel shaped guide member having an axially extending mounting portion received in said channel defined in said return portion of said easing, said funnel shaped portion tapering from wider to narrower as it approaches said air side surface of said seal, said funnel shaped guide having a minimum inside diameter larger than a minimum inside diameter of said seal band, when said seal hand is in place over the rotary member.

2. An oil seal as defined in claim 1 wherein said funnel-shaped portion is made at least in part from a hard plastic material.

3. An oil seal as defined in claim 1 wherein said funnel shaped guide is made from a Delrin brand thermoplastic material.

4. An oil seal as defined in claim 1 wherein said seal includes a plastic mounting portion which is snugly received in said channel.

5. An oil seal as defined in claim 1 wherein said seal includes a metal flange snugly received in said channel.

6. An oil seal as defined in claim 1 wherein said seal body is supported by an axially extending curved U-shaped elastomeric portion lying between said seal body and said radially inwardly directed flange.

7. An oil seal as defined in claim 1 wherein said seal body is supported by an elastomeric formation extending radially inwardly from said radially inwardly directed flange.

8. An oil seal as defined in claim 1 wherein said end portion of said shall to be inserted is a splined shaft.

9. An oil seal comprising:
a casing, including:
a first portion adapted to be received snugly with respect to a machine counterbore, the first portion including a return portion that defines a channel; and
a second portion connected to the return portion;
a seal body, supported by said second portion, said seal body having a plurality of curved surfaces thereby providing radial and axial flexibility of said seal body, said seal body further having a sealing lip and a seal band, wherein said casing second portion also supports said sealing lip and includes a sealing lip mounting portion, said seal body further including air and oil side surfaces meeting along a seal band of intended contact with a shaft to be sealed, said sealing lip having a first, given diameter;
a guide member secured in said channel of said casing, said guide member having a radially outer surface, a radially innermost surface which has a greater diameter than said first given diameter of said sealing lip, and a tapered guide surface on said guide member lying between said radially outer surface and said radially innermost surface and being adapted to guide the nose of the shaft entering the oil seal from the air side of the seal.

10. An oil seal as defined in claim 9 wherein said first portion includes an axial flange and a return flange and wherein said guide member fits snugly on said return flange.

11. An oil seal as defined in claim 9 wherein said guide member is a composite member including a metal portion and a synthetic resin portion.

12. An oil seal as defined in claim 9 wherein said guide member is all metal.

13. An oil seal comprising:
a seal casing including:
a first radially outer portion adapted to be received in a machine counterbore; and
a return portion being spaced radially inwardly from said radially outer portion received in said machine counterbore to define a channel between said first and said return portions; and
a radially inwardly directed flange;
an elastomeric seal, supported by said radially inwardly directed flange, said seal including a seal body being supported by and extending from said radial flange, said seal body having air and oil side surfaces meeting along a seal band of intended contact with a rotary member, said seal body being supported by an elastomeric formation extending radially inwardly from said radial flange, said seal body thereby having a plurality of curved surfaces thereby providing radial and axial flexibility of said seal body; and
a funnel shaped guide member to guide the end portion of a shaft to be inserted in said oil seal, said funnel shaped guide member being of one piece plastic construction and having an axially extending mounting portion of a width such that said mounting portion is snugly received in said channel, said funnel shaped portion tapering from wider to narrower as it approaches said air side of said seal, said funnel having a minimum inside diameter larger than a minimum diameter of said seal hand, when said seal band is in place over the rotary member.

14. An oil seal having a seal casing including
a first portion adapted to be received in a machine counterbore,
a return portion being spaced radially inwardly from said portion received in said machine counterbore to define a channel between said first and said return portions, and
a radially inwardly directed flange for supporting an elastomeric seal, said seal including
a seal body being supported by and extending from said flange, said seal body having air and oil side surfaces meeting along a seal band of intended contact with a rotary member, and a funnel shaped guide member to guide the end portion of a shall to be inserted in said oil seal, said funnel shaped guide member having
   an axially extending mounting portion received in said channel, said funnel shaped portion tapering from wider to narrower as it approaches said air side of said seal, said funnel having
   a minimum inside diameter larger than the diameter of said seal band, when said seal band is in place over an associated shaft, and a shipping plug for said seal, said plug having cylindrical body portion snugly engaging said seal band, a closed off end portion, and plural raised ribs on said cylindrical body portion, said ribs being spaced axially from said closed off end portion and snugly engaging said inner diameter of said guide member.

* * * * *